United States Patent
Wyville

(10) Patent No.: US 9,729,178 B2
(45) Date of Patent: *Aug. 8, 2017

(54) PASSIVE INTERMODULATION DETECTION

(71) Applicant: Telefonaktiebolaget LM Ericsson (Publ), Stockholm (SE)

(72) Inventor: Mark William Wyville, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/130,304

(22) Filed: Apr. 15, 2016

(65) Prior Publication Data

US 2016/0233901 A1    Aug. 11, 2016

Related U.S. Application Data

(63) Continuation of application No. 14/384,258, filed as application No. PCT/IB2014/061141 on May 1, 2014, now Pat. No. 9,438,285.

(51) Int. Cl.
*H04B 1/10* (2006.01)
*H04B 17/26* (2015.01)
*H04J 11/00* (2006.01)

(52) U.S. Cl.
CPC .......... *H04B 1/1027* (2013.01); *H04B 1/109* (2013.01); *H04B 17/26* (2015.01); *H04J 11/0023* (2013.01)

(58) Field of Classification Search
USPC .................. 375/219; 455/423, 73, 79, 295
See application file for complete search history.

(56) References Cited

U.S. PATENT DOCUMENTS 5,321,847 A    6/1994  Johnson, Jr.
2007/0105519 A1*  5/2007  Perkins ............. H03D 3/008
                                        455/295

(Continued)

FOREIGN PATENT DOCUMENTS

EP    1 067 698 A1    1/2001
EP    2 104 266 A2    9/2009
WO    2011144103 A2  11/2011

OTHER PUBLICATIONS

International Search Report and Written Opinion dated Feb. 20, 2015 for International Application Serial No. PCT/IB2014/061141, International Filing Date: May 1, 2014 consisting of 7-pages.

(Continued)

*Primary Examiner* — Eva Puente
(74) *Attorney, Agent, or Firm* — Christopher & Weisberg, P.A.

(57) ABSTRACT

A method, apparatus and receiver for detecting intermodulation distortion (IMD) affecting a received signal in a wireless receiver are provided. One method includes determining a measurement indicative of IMD based on at least one transmit signal. When the measurement indicative of IMD exceeds a first pre-determined level, at least one sample of an amplitude of a signal output by the wireless receiver is collected in a first data set. When the measurement indicative of intermodulation distortion does not exceed a second pre-determined level, the second predetermined level being less than the first predetermined level, at least one sample of an amplitude of the signal output by the wireless receiver is collected in a second data set. A comparison is performed based on data of the first data set and on data of the second data set to determine a measure of IMD.

25 Claims, 8 Drawing Sheets

(56) References Cited

U.S. PATENT DOCUMENTS

| | | | |
|---|---|---|---|
| 2008/0039045 A1* | 2/2008 | Filipovic | H04B 1/109 |
| | | | 455/295 |
| 2008/0102773 A1* | 5/2008 | Buchwald | H04B 1/109 |
| | | | 455/232.1 |
| 2009/0181624 A1 | 7/2009 | Jones | |
| 2011/0075752 A1 | 3/2011 | Zheng et al. | |
| 2012/0295558 A1* | 11/2012 | Wang | H04B 1/109 |
| | | | 455/79 |
| 2013/0044791 A1* | 2/2013 | Rimini | H04B 1/109 |
| | | | 375/219 |
| 2013/0208631 A1 | 8/2013 | Dufrene | |
| 2015/0087242 A1* | 3/2015 | Bain | H04B 1/1027 |
| | | | 455/73 |
| 2015/0133111 A1* | 5/2015 | Bevan | H04B 1/1027 |
| | | | 455/423 |
| 2015/0244414 A1 | 8/2015 | Yu et al. | |

OTHER PUBLICATIONS

Najam Muhammad Amin and Michael Weber "Transmit and Receive Crosstalk Cancellation" 2010 6th International Conference on Emerging Technologies (ICET), pp. 210-215, Print ISBN: 978-1-4244-8058, Location and Date of Conference: Islamabad, Pakistan, Oct. 18-19, 2010 consisting of 6-pages.

* cited by examiner

PASSIVE INTERMODULATION DETECTION

CROSS-REFERENCE TO RELATED APPLICATION

This application is a continuation of U.S. patent application Ser. No. 14/384,258, filed Sep. 10, 2014, entitled PASSIVE INTERMODULATION DETECTION, which is a U.S. National Stage Application of PCT/IB2014/061141, filed May 1, 2014, entitled PASSIVE INTERMODULATION DETECTION, the entirety of which both are incorporated herein by reference.

TECHNICAL FIELD

The embodiments described herein relate to wireless communications and in particular to a method and system for determining an extent of intermodulation distortion in a wireless receiver.

BACKGROUND

Passive intermodulation (PIM) occurs when signals are present in a passive device that exhibits some non-linear behavior. In a base station, such as an evolved node B (eNB) of a long term evolution (LTE) wireless communication system, high power signals can cause measureable PIM due to non-linear behavior of components such as RF transmission cables, duplexers, connectors, antenna, or some object external to an antenna of the base station.

Passive intermodulation (PIM) distortion is problematic for multi-band transmitters when intermodulation distortion (IMD) falls into occupied receiver (Rx) channels, which desensitizes the receiver. Multi-band signals are an important characteristic of LTE and multi-standard radios, so the occurrence of PIM problems will be more frequent than with previous cellular wireless communication standards. There are many causes of PIM related to materials, manufacturing quality and quality of workmanship by installation and maintenance technicians.

A test can be conducted during the installation of a base station to detect sources of PIM. In such a PIM test, one technician monitors the third order intermodulation distortion (IMD3) of two high power input signals, while another person taps and wiggles (dynamic testing) all connectors, cables and components between the TX port on the radio and the antenna. Failed PIM tests could be a result of failing components, over or under-tightened connectors, or dirty connectors, including metal flakes. Some PIM sources will not be detected during this test and are later catalyzed by some change in the environment, e.g., wind, train vibrations, temperature, etc. Other PIM sources can develop with aging, such as corrosion. If a PIM problem is detected at a base station during normal operation, then a crew is sent to identify and remove the PIM source. In some cases the PIM source may be due to some object external to the base station like a fence. In this case the PIM source cannot be removed, so the antenna may need to be re-oriented or the transmit power decreased.

In a base station, the high power transmit signal of the base station transmitter is typically a source of PIM distortion when the transmit signal passes through a passive device that exhibits some non-linearity. Therefore, the PIM distortion may be considered a nonlinear function of the transmit signal. Several methods have been proposed to estimate PIM distortion that falls into a band of the desired receive signal. One such method involves multiplying transmitted signals to generate $2^{nd}$ and higher order IMD products. Complex weights are then applied to each IMD product in a manner that reduces the PIM distortion in the receiver pass band. This approach models the PIM source with a polynomial model, and passes the transmit signal through the polynomial model to estimate the PIM distortion in the receiver pass band.

In another approach, an output signal of the power amplifier (PA) of the transmitter is tapped and fed to an auxiliary receiver, called a cancellation receiver. The cancellation receiver is tuned to the desired receiver pass band. The signal content in the receiver pass band at the PA output is presumed to be due to intermodulation products (IMPs) from the transmit signals caused by non-linear behavior of the PA. These IMPs in the receiver pass band are then adaptively filtered in the cancellation receiver so as to match the PIM signal at the output of the main receiver. The estimate of the PIM in the cancellation receiver is subtracted from the output of the main receiver.

A problem with these two approaches is that their models are trained with a PIM signal that is typically weaker than the uplink signal, even when the uplink signal is only noise and in-band interference. Further, both of these approaches require provision of an additional receiver.

SUMMARY

The embodiments described herein advantageously provide a method and system for detecting intermodulation distortion (IMD) affecting a received signal in a wireless receiver. According to one aspect, embodiments include a method for intermodulation distortion detection. The method includes determining a measurement indicative of intermodulation distortion based on at least one transmit signal. When the measurement indicative of intermodulation distortion exceeds a first pre-determined level, at least one sample of an amplitude of a signal output by the wireless receiver is collected in a first data set. When the measurement indicative of intermodulation distortion does not exceed a second pre-determined level, the second predetermined level being less than the first predetermined level, at least one sample of an amplitude of the signal output by the wireless receiver is collected in a second data set. A comparison is performed based on data of the first data set and on data of the second data set to determine a measure of intermodulation distortion.

According to this aspect, in some embodiments, an expected delay of the at least one transmit signal observed by the wireless receiver is determined to determine which of the at least one sample to include in one of the first and second data sets. In some embodiments, a time of collecting at least one sample in one of the first data set and the second data set is determined based on an estimated delay associated with an intermodulation distortion source. In some embodiments, the measurement indicative of intermodulation distortion is based on an instantaneous amplitude of an Nth order product of transmit signals. In some embodiments, the measurement indicative of intermodulation distortion is an instantaneous value of a product of baseband values of two transmit signals and the first pre-determined level is a specified level greater than an average value of the product of the baseband values. In some embodiments, the measurement indicative of intermodulation distortion is an instantaneous value of a product of baseband values of two transmit signals and the second pre-determined level is specified level less than an average value of the product of the baseband values. In some embodiments, the comparison is a comparison of a mean value of the first data set to a mean value of the second data set. In some embodiments, the method includes generating a first statistical distribution based on data of the first data set, and generating a second statistical distribution based on data of the second data set. The comparison is then a comparison of the first statistical distribution and the second statistical distribution. In some embodiments, an extent to which the first statistical distribution and the second statistical distribution differ indicates an extent of intermodulation distortion. In some embodiments, the comparison is a comparison of a calculated mean square difference between the first statistical distribution and the second statistical distribution to a threshold. In some embodiments, the method also includes generating a third statistical distribution based on data in a third data set, the data in the third data set being collected when the measurement indicative of intermodulation distortion exceeds a third predetermined level when the receiver output has a second average received signal power that is different from a first average received signal power existing during collection of data of the first data set. In these embodiments, the method further includes generating a fourth statistical distribution based on data in a fourth data set, the data in the fourth data set being collected when the measurement indicative of intermodulation distortion does not exceed a fourth pre-determined level when the receiver output has the second average received signal power. In some embodiments, the method is performed without disabling live traffic into the receiver.

According to another aspect, the embodiments include an apparatus for detecting intermodulation distortion affecting a received signal in a wireless receiver. The apparatus includes a memory and a processor. The memory is configured to store a first data set that includes samples of an amplitude of a receiver signal collected when a measurement indicative of intermodulation distortion exceeds a first pre-determined level. The memory is further configured to store a second data set that includes samples of the amplitude of the receiver signal collected when the measurement indicative of intermodulation distortion does not exceed a second pre-determined level, the second pre-determined level being less than the first pre-determined level. The processor is in communication with the memory and is configured to collect the samples of the first data set when the measurement indicative of intermodulation distortion exceeds the first pre-determined level and to collect the samples of the second data set when the measurement indicative of intermodulation distortion does not exceed the second pre-determined level. The processor is further configured to perform a comparison based on data of the first data set and on data of the second data set to determine a measure of intermodulation distortion.

According to this aspect, in some embodiments, the processor is further configured to determine an expected delay of transmit signals observed by a wireless receiver to determine which samples to include in each of the first and second data sets. In some embodiments, a time of collecting a sample is determined based on an estimated delay associated with an intermodulation distortion source. In some embodiments, the measurement indicative of intermodulation distortion is based on an instantaneous amplitude of an Nth order product of transmit signals. In some embodiments, the measurement indicative of intermodulation distortion is an instantaneous value of a product of baseband values of two transmit signals and the first pre-determined level is a specified level greater than an average value of the product of the baseband values. In some embodiments, the measurement indicative of intermodulation distortion is an instantaneous value of a product of baseband values of two transmit signals and the second pre-determined level is a specified level less than an average value of the product of the baseband values. In some embodiments, the comparison is a comparison of a mean value of the first data set to a mean value of the second data set. In some embodiments, the processor is further configured to: generate a first statistical distribution based on data of the first data set, and generate a second statistical distribution based on data of the second data set. In these embodiments, the comparison is a comparison of the first statistical distribution and the second statistical distribution. In some embodiments, an extent to which the first statistical distribution and the second statistical distribution differ indicates an extent of intermodulation distortion.

According to yet another aspect, embodiments include a receiver equipped to determine a condition of intermodulation distortion. The receiver includes a detector module configured to detect a measurement indicative of intermodulation distortion. The receiver also includes a collector module configured to collect in a first data set samples of a receiver signal amplitude when the measurement indicative of intermodulation distortion exceeds a first pre-determined level and to collect in a second data set samples of the receiver signal amplitude when the measurement indicative of intermodulation distortion does not exceed a second pre-determined level, the second pre-determined level being less than the first pre-determined level. The receiver also includes a comparator module configured to perform a comparison based on data of the first data set and data of the second data set to determine a measure of intermodulation distortion.

According to this aspect, in some embodiments, the receiver further includes a transmit module configured to transmit at least one transmit signal, a receiver module configured to receive a signal arising from the at least one transmit signal, and a delay determination module configured to determine an expected delay between the at least one transmit signal and the receiver signal to determine which samples to include in each of the first and second data sets. In some embodiments, the receiver further includes a statistical distribution generation module configured to generate a first statistical distribution based on data in the first data set collected by the collector module and to generate a second statistical distribution based on data in the second data set collected by the collector module. In these embodiments, the comparator module performs a comparison of the first statistical distribution and the second statistical distribution. In some embodiments, the comparator module is further configured to indicate remedial action to correct intermodulation distortion when the first and second statistical distributions are substantially different.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
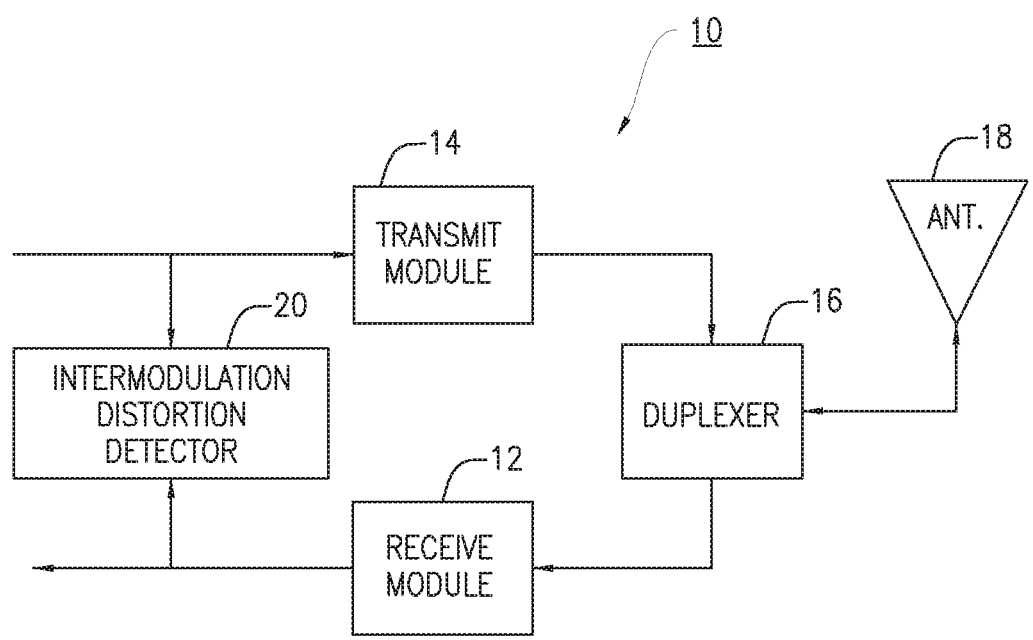
FIG. 1 is a block diagram of a radio configured according to principles set forth herein.

Before describing in detail example embodiments that are in accordance with the present disclosure, it is noted that the embodiments reside primarily in combinations of apparatus components and processing steps related to detection of intermodulation distortion such as passive intermodulation distortion affecting a receiver in a radio. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

When a radio receiver of a base station receives a desired signal from a wireless device, the radio receiver may also receive intermodulation distortion (IMD) due to passive intermodulation (PIM). Note that as used herein, IMD includes, but is not limited, to PIM. As explained below, methods of detecting PIM may be employed to detect IMD, generally, such as IMD from a transmitter of the base station. Thus, where detection of PIM is described herein, the description and application of methods and apparatus described herein may apply more generally to IMD.

Embodiments described herein detect a presence of PIM in the received signal. In particular, the received signal may be sampled to generate a first data set during conditions that are favorable for PIM and may be sampled to generate a second data set during conditions that are unfavorable for PIM. Conditions that are unfavorable for PIM exist when the signals that generate the PIM have low instantaneous power levels at the PIM source. Conditions that are favorable for PIM exist when the signals that generate the PIM have high instantaneous power levels at the PIM source. The signals that generate the PIM are the transmit signals of a radio transmitter of the base station. The transmit signals are known and are used to determine when there are favorable or unfavorable conditions for PIM.

In some embodiments, a statistical comparison of the first and second data set may be performed to determine a measure of intermodulation distortion. For example, a mean value of the data of the first data set can be compared to a mean value of the data of the second data set. An extent to which the two mean values differ indicates an extent of intermodulation distortion. Thus, if the two mean values are similar, IMD is considered to be low. If the two mean values differ substantially, IMD is considered to be high. As another example, a variance of the data of the first data set can be compared to a variance of the data of the second data set to determine an extent of intermodulation distortion.

In some embodiments, a first statistical distribution may be obtained from the first data set and a second statistical distribution may be obtained from the second data set. The two statistical distributions may then be compared. If the two statistical distributions are significantly different, then the received signal has a component that is dependent on the instantaneous amplitudes of the transmitted signal, indicating significant intermodulation distortion. Conversely, if the two statistical distributions are very similar, then any IMD from the transmitter is much smaller than the received signal, which means that if PIM exists, the PIM is low enough to be non-problematic. Thus, for example, a calculated mean square difference between the first statistical distribution and the second statistical distribution may be compared to a threshold. An extent to which the threshold is exceeded may be used to indicate an extent of intermodulation distortion.

\Referring now to the drawing figures, there is shown in FIG. 1 a block diagram of a radio 10 for detecting intermodulation distortion in a receive module 12. The radio 10 includes the receive module 12, a transmit module 14, a duplexer 16, an antenna 18 and an intermodulation distortion (IMD) detector 20. The transmit module 14 receives a signal to be transmitted that may include a single band signal or two or more bands of signals separated by frequency spacings, i.e., a multi-band signal. For example, the transmit signal may include one or more orthogonal frequency division multiplex (OFDM) signals and/or one or more wide band code division multiple access (WCDMA) signals. The transmit module 14 amplifies the input signal and may also apply pre-distortion to compensate for the non-linearity of a power amplifier of the transmit module 14. The output signal of the transmit module 14 is fed to the duplexer 16 which operates to isolate the output signal of the transmit module 14 from entering the receive module 12 and to feed the output signal of the transmit module 14 to the antenna 18. In the receive path, a signal received from the antenna 18 is fed to the duplexer 16 which operates to isolate the signal from the antenna 18 from entering the transmit module 14 and to feed the signal from the antenna 18 to the receive module 12.

The intermodulation distortion detector 20 samples the transmit signals that are input to the transmit module 14 to determine if conditions are favorable or unfavorable for PIM. For example, the intermodulation distortion detector 20 may determine that conditions are favorable for PIM when an instantaneous value of a product of baseband values of two transmit signals exceeds a first pre-determined level. In some embodiments, the first pre-determined level is a specified level greater than an average value of the product of the baseband values. The specified level may be, for example, 6 dB greater than the average value. The intermodulation distortion detector 20 may determine that conditions are unfavorable for PIM when the instantaneous value of the product of baseband values of the two transmit signals fails to exceed a second pre-determined level. In some embodiments, the second predetermined level is a specified level less than the average value of the product of the baseband values. The specified level may be, for example, 20 dB less than the average value. Although, a product of two transmit signals is described, a product of more than two transmit signals may also be employed in determining whether conditions are favorable or unfavorable for passive intermodulation.

When a condition favorable for PIM is detected, the IMD detector 20 adds a corresponding sample or series of samples of the received signal to a first data set. When a condition unfavorable for PIM is detected, the IMD detector 20 adds a corresponding sample or series of samples of the received signal to a second data set. In one embodiment, a statistical distribution is generated for each of the first and second data sets. For example, the statistical distribution could be the probability density function of the received signal's amplitude. Examples of these statistical distributions are shown in FIGS. 2-6.

Figure 2:
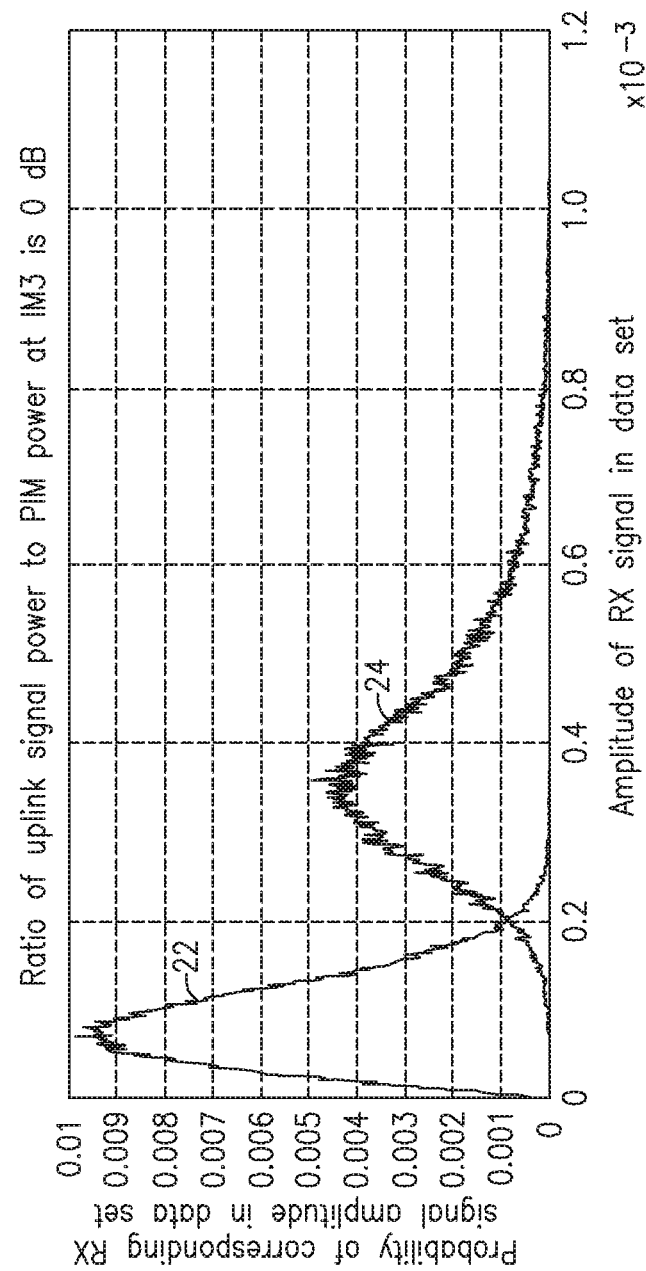
FIGS. 2-6 are graphs of statistical distributions representing data collected during conditions favorable and unfavorable for IMD for different values of a ratio of an uplink signal power to a PIM power.
Figure 3:
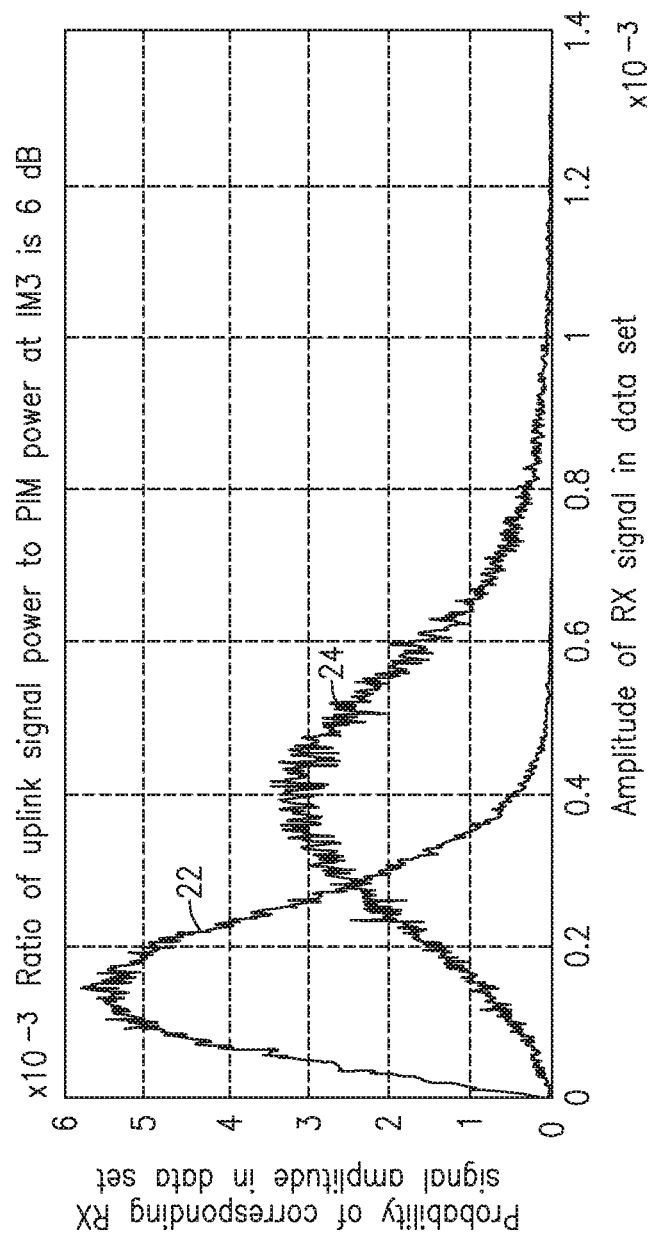
Figure 4:
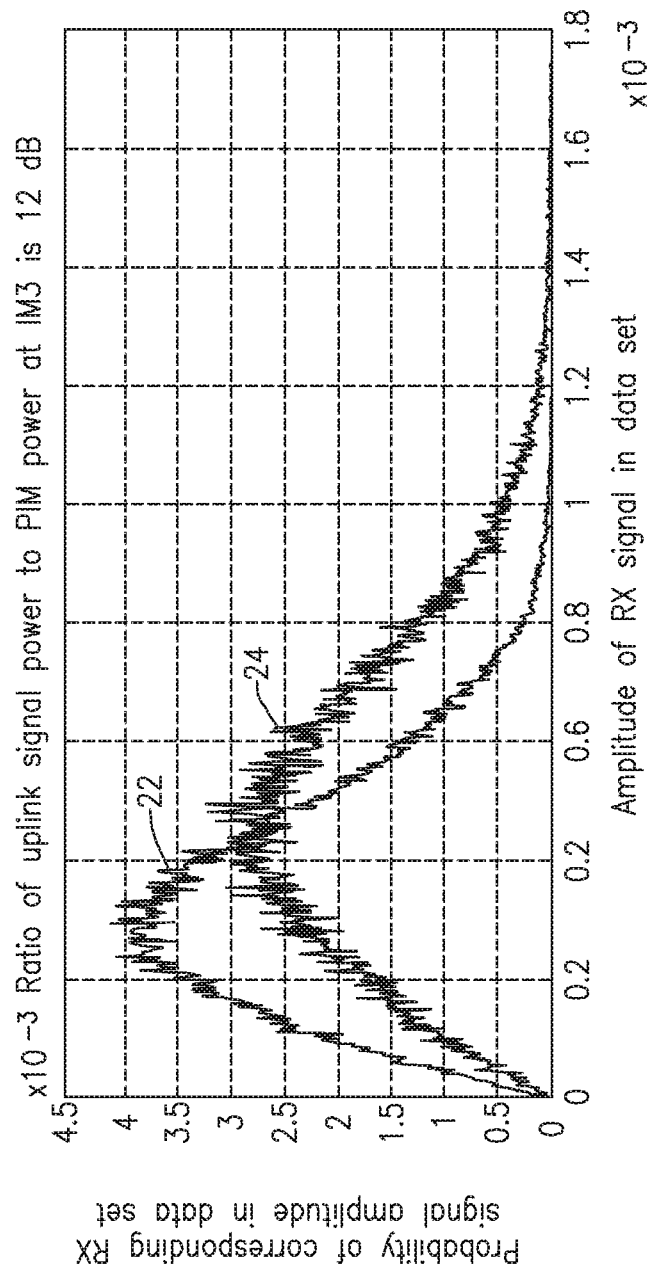
Figure 5:
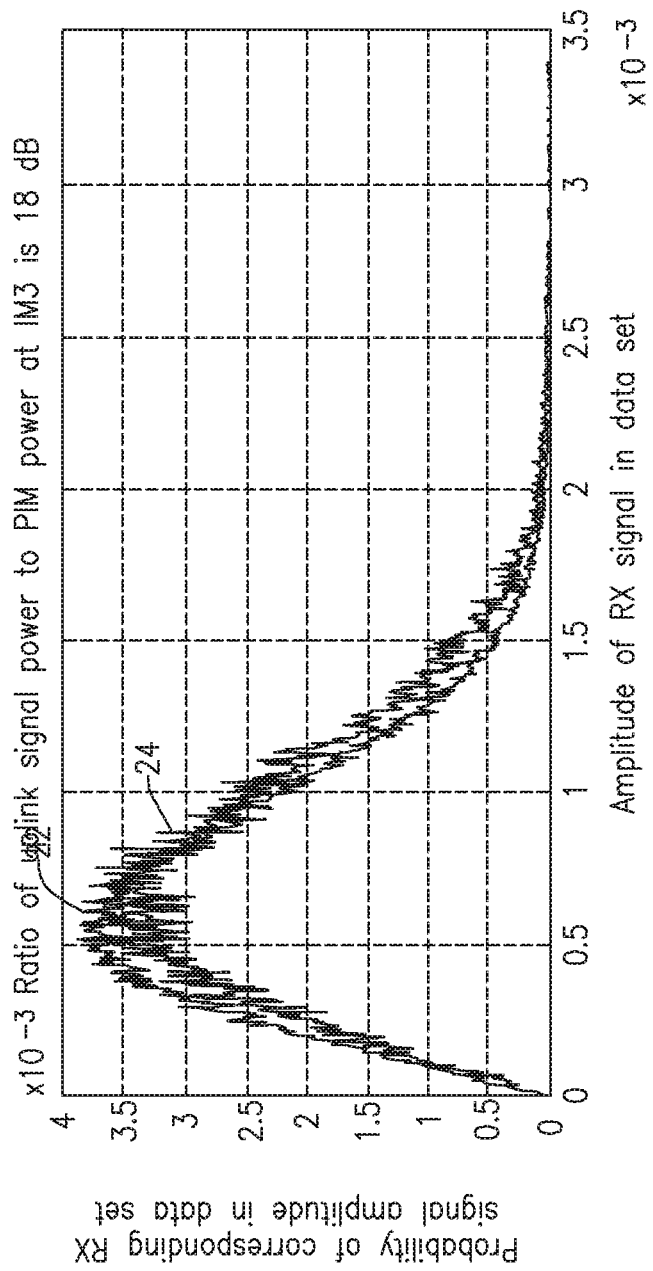
Figure 6:
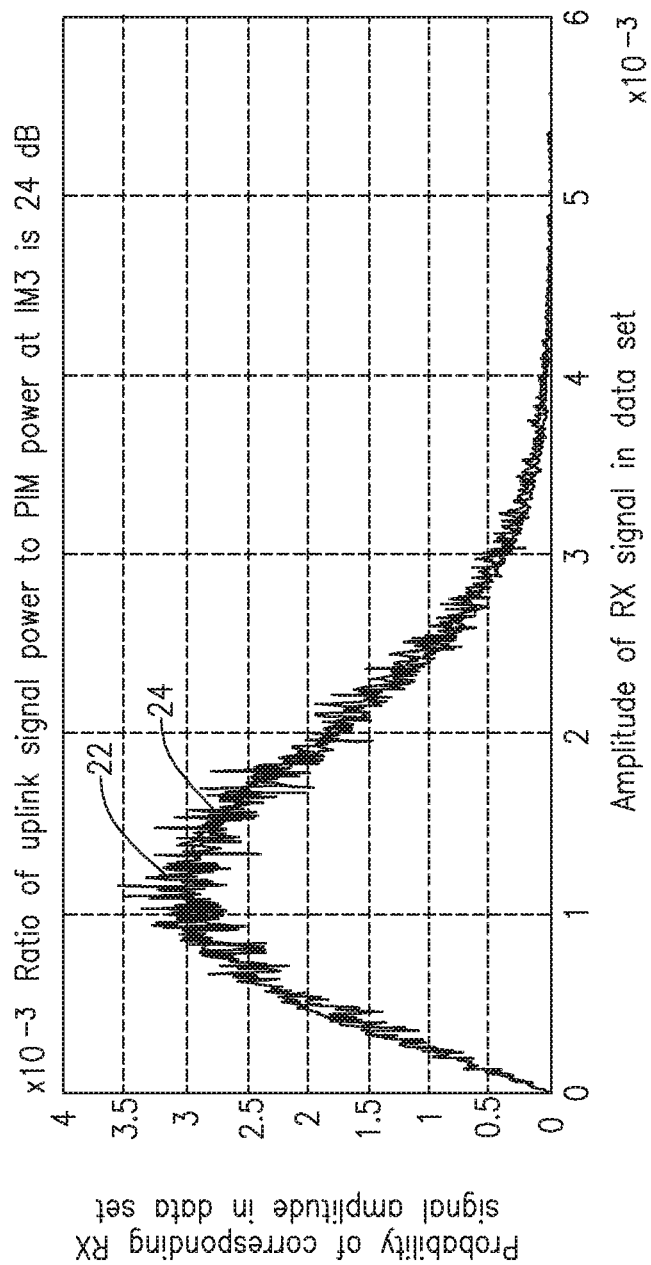

FIGS. 2-6 are graphs of the probability density function 24 for the first data set favorable for PIM and the probability density function 22 for the second data set unfavorable for PIM, for different values of the ratio of uplink signal power to PIM power at a third order intermodulation (IMD3) level. In FIG. 2, the ratio is 0 dB. In FIG. 3, the ratio is 6 dB. In FIG. 4, the ratio is 12 dB. In FIG. 5, the ratio is 18 dB. In FIG. 6, the ratio is 24 dB. A simulator was used to generate a receive signal having an uplink signal as well as PIM caused by two transmit signals. The uplink signal may consist of any combination of the desired uplink signal, receiver noise, and in-band interference.

Referring to FIGS. 2-6, as the ratio of the uplink signal power to PIM power increases (indicating a lower relative level of PIM), the probability density functions 22 and 24 merge and ultimately overlap so that when the ratio is 24 dB, as shown in FIG. 6, the two functions are indistinguishable. Thus, an extent to which the first and second statistical distributions differ indicates an extent of intermodulation distortion. The larger the difference between the distributions, the larger the intermodulation distortion. In some embodiments, a measure of the difference between the statistical distributions may be made by calculating the mean square difference between the distributions and comparing the mean square difference to a threshold. An extent to which the mean square difference exceeds the threshold is an indication of the extent of IMD.

Referring to FIG. 4, PIM can be detected even when the PIM is 12 dB or more below the uplink signal. If PIM is detected when the PIM is 12 dB below the receive module's noise floor, then the PIM will not significantly degrade the receiver performance. In such event, a network operator could schedule maintenance on the radio 10 at an advantageous time, instead of immediately. This is preferable to the alternative of PIM going unnoticed until the PIM degraded receiver performance to a point of significant degradation, resulting in lost coverage and capacity. Thus, embodiments described herein permit detection of PIM before the PIM significantly degrades receiver performance.

The time delay between when the transmit signals are sent into the transmitter and when the corresponding PIM is received in the digital domain and manifests itself in the output of the receiver depends on the position of the PIM source, which is not known a priori, because the PIM can be due to many different mechanisms. In some embodiments the process of collecting samples for favorable and unfavorable PIM conditions can be performed for each expected delay of a set of expected delays in succession, the expected delays being associated with probable PIM sources. The probable PIM sources may be, for example, RF connectors. In some embodiments, instead of capturing a single sample during a condition favorable or unfavorable for PIM, several consecutive samples are taken during a window of time to capture the effects over a range of delays. All or some of these samples may be used to detect PIM. For example, a sample that is the maximum value of all the samples may be selected as the basis for determining PIM.

The processes described herein may be employed during normal operation of the radio or may be employed with the uplink traffic to the receiver disabled. In some embodiments, when the IMD detection process is employed during operation of the radio when uplink traffic is not disabled, the process of collecting samples may be restarted when the statistical distribution of the uplink traffic changes. In some embodiments, different statistical distributions can be collected for different average received power levels. Thus, for example, a first set of statistical distributions may be generated for data collected when the average received power is high, and a second set of statistical distributions may be generated for data collected when the average received power is lower. In some embodiments, no change is made even if the received signal statistical distribution changes.

In some embodiments, uplink traffic may be disabled during the process of PIM detection. If some PIM is present when the uplink signal is disabled, the greater will be the difference between statistical distributions based on data collected when the uplink traffic is disabled. This is evident from FIGS. 2-6. PIM detection when the uplink traffic is disabled may advantageously be employed when PIM is weak. In some embodiments, a selective application of various test signals applied to the transmit module 14 may be employed when testing for PIM when the uplink traffic is disabled.

Figure 7:
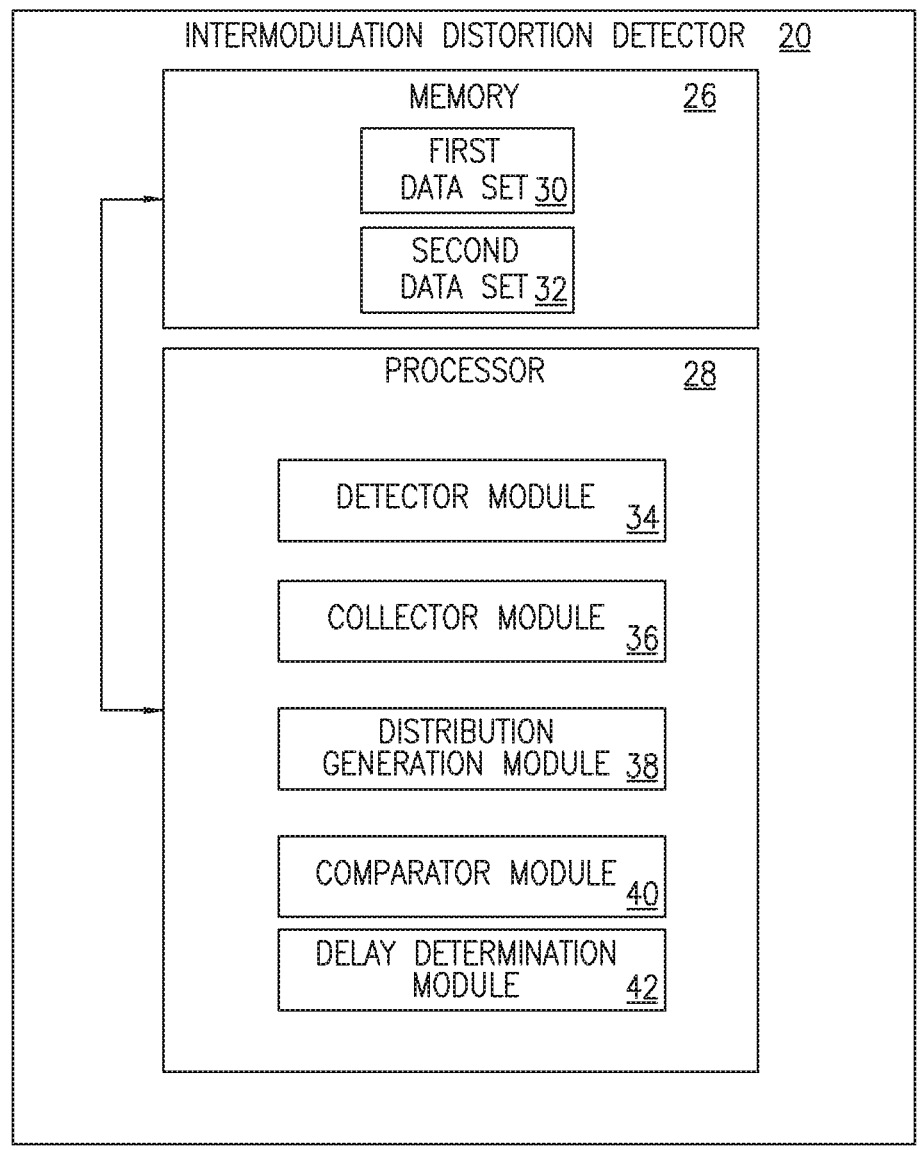
FIG. 7 is a block diagram of an IMD detector constructed in accordance with principles described herein.

FIG. 7 is a block diagram of an IMD detector 20 configured to collect samples, and determine a presence of PIM. The IMD detector 20 includes a memory 26 and a processor 28. The memory 26 is configured to store at least a first data set 30 and a second data set 32. The first data set 30 has data that is collected when conditions are favorable for PIM and the second data set 32 has data that is collected when conditions are unfavorable for PIM.

The processor 28 is configured to perform various functions for determining PIM. In some embodiments, the processor 28 executes computer code that causes the processor to execute functions described herein. In some embodiments, the processor 28 is application specific integrated circuitry configured to perform the functions described herein. Thus, in some embodiments, the detector module 34, the collector module 36, the distribution generation module 38, the comparator module 40 and the delay determination module 42 are software modules, whereas in other embodiments, some or all of these modules are implemented in specific hardware circuitry.

The detector module 34 of the processor 28 functions to detect conditions favorable or unfavorable for PIM. For example, the detector module 34 may sample the transmit signals being submitted to the transmit module 14 and determine that a condition favorable to PIM exists when a product of instantaneous amplitudes of input transmit signals exceed a first threshold and determine that a condition unfavorable to PIM exists when the product falls below a second threshold lower than the first threshold.

The collector module 36 of the processor 28 functions to collect samples of the output of the receive module 12 during conditions determined by the detector module 34 to be favorable for PIM and store the collected samples in the first data set 30. The collector module 36 also functions to collect samples of the output of the receive module 12 during conditions determined by the detector module 34 to be unfavorable for PIM and store these samples in the second data set 32.

In some embodiments, the processor 28 may include a distribution generation module 38 that functions to generate statistical distributions based on the data collected by the collector module 36. For example, a statistical distribution may be a probability density function. These statistical distributions may serve as a basis for determining a presence of PIM. Note it is contemplated that not all embodiments have a distribution generation module 38, but may instead have a moment generation module (not shown) to generate moments of the data, such as a mean value and/or variance.

A comparator module 40 of the processor 28 functions to perform a comparison based on the data of the first data set 30 and the second data set 32 collected by the collector module 36. In some embodiments, for example, the comparator module 40 may compare a mean value of each data set. If the mean values are similar, a determination of low PIM may be made, whereas, if the mean values differ substantially, a determination of high PIM may be made. A low PIM may be, for example, below 18 dB lower than the uplink signal power, and a high PIM may be, for example, above 12 dB below the uplink signal power. In some embodiments, the comparator module 40 may compare attributes of statistical distributions generated by the distribution generation module 38 based on the two data sets to determine an extent of PIM.

A delay determination module 42 of the processor 28 functions to determine a delay or group of delays associated with one or more PIM sources. A delay is the time it takes for a transmit signal to go into the radio 10, generate PIM and then be observed by the receive module 12. The determined delay or group of delays determine the timing for collecting the samples of the first and second data sets.

Figure 8:
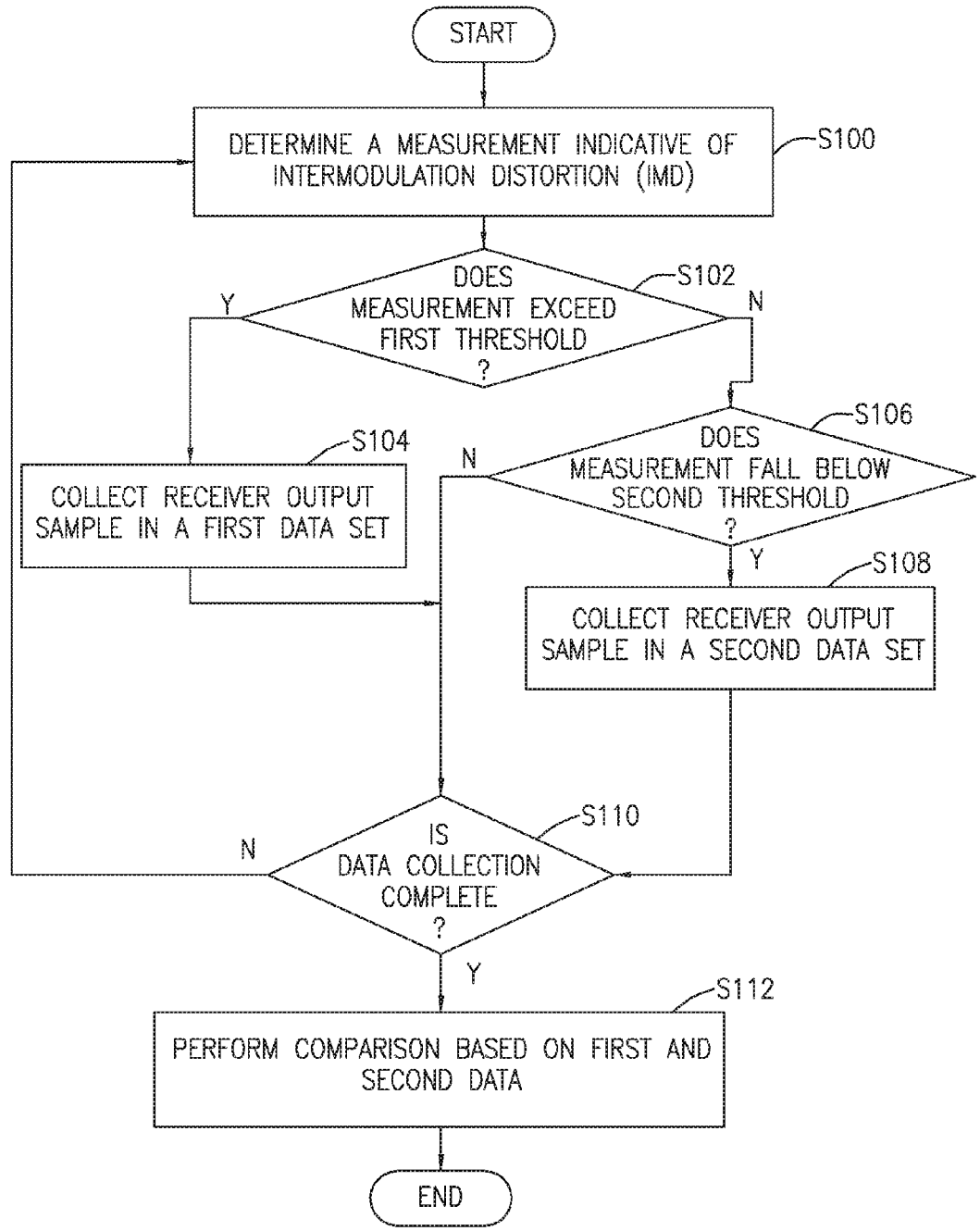
FIG. 8 is a flowchart of an exemplary process of detecting IMD in a radio receiver.

FIG. 8 is a flowchart of an exemplary process of determining the presence of PIM in a radio. A measurement indicative of IMD is determined by the detector module 34 (block S100). This measurement may be, for example, an instantaneous amplitude of a product of transmit signals being input to the transmit module 14. In some embodiments, the measurement indicative of intermodulation distortion is based on an instantaneous amplitude of an Nth order product of transmit signals. For example, a third order product of transmit signals may be defined as a product of a square of an amplitude of a signal in a first band times an amplitude of a signal in a second band. If the signal of the first band is at frequency f1 and the signal of the second band is at frequency f2, then the third order product will be at 2f1-f2, where f2 is greater than f1. The measurement indicative of IMD may be compared to a first threshold (block S102). This threshold may be, for example, a specified level above the average value of the amplitude of the product of transmit signals, thereby indicating a condition favorable for PIM. If the measurement exceeds the first threshold, a sample or group of samples of the output of the receive module 12 is collected in the first data set by the collector module 36 (block S104). A time of collection of data for the first data set may be based on determination of a delay or delays associated with one or more PIM sources, as determined by the delay determination module 42.

If the measurement does not exceed the first threshold, a determination is made whether the measurement falls below a second threshold (block S106). The second threshold may be, for example, a specified level below the average value of the amplitude of the product of transmit signals, thereby indicating a condition unfavorable for PIM. If the measurement falls below the second threshold, a sample or group of samples of the output of the receive module 12 is collected in the second data set by the collector module 36 (block S108). A time of collection of data for the second data set may be based on determination of a delay or delays associated with one or more PIM sources, as determined by the delay determination module 42. If the measurement does not fall below the second threshold, then a determination is made whether data collection is complete (block S110). Data collection may end based on the total number of data samples collected, for example. If data collection is not complete, the process returns to block S100. If data collection is complete, a comparison is performed by the comparator module 40 based on the first and second data to determine an extent of IMD (block S112).

Note that although reference is made herein to favorable and unfavorable conditions for PIM, any two different conditions may be used. For example, conditions indicative of medium PIM and strong PIM could be used. In some embodiments the conditions to be used are indicative of very weak PIM, such as below 18 dB below uplink signal power, and very strong PIM, such as above 0 dB above uplink signal power. Note also, that in addition to detecting passive intermodulation (PIM), embodiments may also be employed to detect intermodulation distortion (IMD) generated in the transmit module 14, which if detected, could be remedied. Further, as noted above, determination of an extent of intermodulation distortion based on data collected in the first and second data sets can be performed in different ways, including comparing a mean or variance of the data of the data sets or generating and comparing statistical distributions of the data of each data set. Also note that the detection measurements for determining a condition of PIM may be based on the amplitude of a single input transmit signal or based on a product of amplitudes of two or more input transmit signals.

An advantage of embodiments described herein is that no model of PIM is required or assumed. Also, the PIM can be detected even when the PIM is much weaker than the received signal. Further, testing is possible during normal radio operation without disabling the uplink traffic. However, in some embodiments, the uplink traffic may be disabled for determining PIM. Embodiments enable detection and repair of PIM before PIM reaches the point of significant receiver degradation.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of detecting intermodulation distortion affecting a received signal in a wireless receiver, the method comprising:
    determining a measurement indicative of intermodulation distortion based on at least one transmit signal;
    when the measurement indicative of intermodulation distortion exceeds a first pre-determined level, collecting at least one sample of an amplitude of a signal output by the wireless receiver in a first data set;
    when the measurement indicative of intermodulation distortion does not exceed a second pre-determined level, the second predetermined level being less than the first predetermined level, collecting at least one sample of an amplitude of the signal output by the wireless receiver in a second data set;
    performing a comparison based on data of the first data set and on data of the second data set to determine a measure of intermodulation distortion to be mitigated; and
    causing the intermodulation distortion in the received signal to be mitigated based on the determined measure of the intermodulation distortion.

2. The method of claim 1, further comprising determining an expected delay of the at least one transmit signal observed by the wireless receiver to determine which of the at least one sample to include in one of the first and second data sets.

3. The method of claim 1, wherein a time of collecting at least one sample in one of the first data set and the second data set is determined based on an estimated delay associated with an intermodulation distortion source.

4. The method of claim 1, wherein the measurement indicative of intermodulation distortion is based on an instantaneous amplitude of an Nth order product of transmit signals.

5. The method of claim 1, wherein the measurement indicative of intermodulation distortion is an instantaneous value of a product of baseband values of two transmit signals and wherein the first pre-determined level is a specified level greater than an average value of the product of the baseband values.

6. The method of claim 1, wherein the measurement indicative of intermodulation distortion is an instantaneous value of a product of baseband values of two transmit signals and wherein the second pre-determined level is specified level less than an average value of the product of the baseband values.

7. The method of claim 1, wherein the comparison is a comparison of a mean value of the first data set to a mean value of the second data set.

8. The method of claim 1, further comprising:
    generating a first statistical distribution based on data of the first data set; and
    generating a second statistical distribution based on data of the second data set, wherein the comparison is a comparison of the first statistical distribution and the second statistical distribution.

9. The method of claim 8, wherein, an extent to which the first statistical distribution and the second statistical distribution differ indicates an extent of intermodulation distortion.

10. The method of claim 8, wherein the comparison is based on comparing a calculated mean square difference between the first statistical distribution and the second statistical distribution to a threshold.

11. The method of claim 8, further comprising:
    generating a third statistical distribution based on data in a third data set, the data in the third data set being collected when the measurement indicative of intermodulation distortion exceeds a third predetermined level when the receiver output has a second average received signal power that is different from a first average received signal power existing during collection of data of the first data set; and generating a fourth statistical distribution based on data in a fourth data set, the data in the fourth data set being collected when the measurement indicative of intermodulation distortion does not exceed a fourth pre-determined level when the receiver output has the second average received signal power.

12. The method of claim 1, wherein the method is performed without disabling live traffic into the receiver.

13. An apparatus for detecting intermodulation distortion affecting a received signal in a wireless receiver, the apparatus comprising:
a memory configured to store:
a first data set that includes samples of an amplitude of a receiver signal collected when a measurement indicative of intermodulation distortion exceeds a first pre-determined level;
a second data set that includes samples of the amplitude of the receiver signal collected when the measurement indicative of intermodulation distortion does not exceed a second pre-determined level, the second pre-determined level being less than the first pre-determined level; and
a processor in communication with the memory and configured to:
collect the samples of the first data set when the measurement indicative of intermodulation distortion exceeds the first pre-determined level;
collect the samples of the second data set when the measurement indicative of intermodulation distortion does not exceed the second pre-determined level;
perform a comparison based on data of the first data set and on data of the second data set to determine a measure of intermodulation distortion to be mitigated; and
cause the intermodulation distortion in the receiver signal to be mitigated based on the determined measure of the intermodulation distortion.

14. The apparatus of claim 13, wherein the processor is further configured to determine an expected delay of transmit signals observed by a wireless receiver to determine which samples to include in each of the first and second data sets.

15. The apparatus of claim 13, wherein a time of collecting a sample is determined based on an estimated delay associated with an intermodulation distortion source.

16. The apparatus of claim 13, wherein the measurement indicative of intermodulation distortion is based on an instantaneous amplitude of an Nth order product of transmit signals.

17. The apparatus of claim 13, wherein the measurement indicative of intermodulation distortion is an instantaneous value of a product of baseband values of two transmit signals and wherein the first pre-determined level is a specified level greater than an average value of the product of the baseband values.

18. The apparatus of claim 13, wherein the measurement indicative of intermodulation distortion is an instantaneous value of a product of baseband values of two transmit signals and wherein the second pre-determined level is a specified level less than an average value of the product of the baseband values.

19. The apparatus of claim 13, wherein the comparison is a comparison of a mean value of the first data set to a mean value of the second data set.

20. The apparatus of claim 13, wherein the processor is further configured to:
generate a first statistical distribution based on data of the first data set; and
generate a second statistical distribution based on data of the second data set, wherein the comparison is a comparison of the first statistical distribution and the second statistical distribution.

21. The apparatus of claim 20, wherein, an extent to which the first statistical distribution and the second statistical distribution differ indicates an extent of intermodulation distortion.

22. A receiver equipped to determine and mitigate a condition of intermodulation distortion, the receiver comprising:
a detector configured to detect a measurement indicative of intermodulation distortion;
a collector configured to collect in a first data set samples of a receiver signal amplitude when the measurement indicative of intermodulation distortion exceeds a first pre-determined level and to collect in a second data set samples of the receiver signal amplitude when the measurement indicative of intermodulation distortion does not exceed a second pre-determined level, the second pre-determined level being less than the first pre-determined level;
a comparator configured to perform a comparison based on data of the first data set and data of the second data set to determine a measure of intermodulation distortion to be mitigated; and
a corrector configured to cause the intermodulation distortion in the receiver signal to be mitigated based on the determined measure of the intermodulation distortion.

23. The receiver of claim 22, further comprising:
a transmitter configured to transmit at least one transmit signal;
a receiver configured to receive a signal arising from the at least one transmit signal; and
a delay determiner configured to determine an expected delay between the at least one transmit signal and the receiver signal to determine which samples to include in each of the first and second data sets.

24. The receiver of claim 22, further comprising a statistical distribution generator configured to generate a first statistical distribution based on data in the first data set collected by the collector and to generate a second statistical distribution based on data in the second data set collected by the collector; and wherein the comparator performs a comparison of the first statistical distribution and the second statistical distribution.

25. The receiver of claim 24, wherein the comparator is further configured to indicate remedial action to correct intermodulation distortion when the first and second statistical distributions are substantially different.

* * * * *